United States Patent Office 3,261,816
Patented July 19, 1966

3,261,816
VULCANIZATION ACCELERATORS
Krijn van den Boogaart, Vlaardingen, Netherlands, assignor to Fabriek van Chemische Producten Vondelingenplaat N.V., Rotterdam, Netherlands, a Dutch corporation
No Drawing. Filed May 21, 1963, Ser. No. 282,109
8 Claims. (Cl. 260—79.5)

The invention relates to the vulcanization of rubber and more particularly to a class of new compounds, which are curing agents and accelerate the vulcanization of rubber, and to rubber compositions containing these new compounds.

The new compounds of the invention are prepared by condensation of one molar proportion of ethylene diamine with one molar proportion of formaldehyde, conversion of the resultant condensation product with two mols of carbon-disulphide under alkaline conditions, followed by condensation of the resulting product with a dialkylthiocarbamyl-chloride.

The new rubber vulcanization accelerators may be represented by the general formula

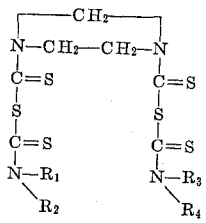

wherein $R_1$, $R_2$, $R_3$ and $R_4$ each represent an alkyl group having from 1 to 4 carbon atoms. As examples of the substituted amino group in the above-mentioned formula the dimethylamino, diethylamino and di-isopropylamino group can be mentioned. The preparation of the compounds of this invention is illustrated by the following example:

EXAMPLE I 78 grams of an 86.2% aqueous solution of ethylene diamine were introduced into a three-necked flask. To this solution 235 milliliters of water were added, and then 84 milliliters of a 40% formaldehyde solution (40 grams of formaldehyde per 100 cm.³) were added with cooling so that the temperature was maintained at 20° C. 91.5 grams of NaOH was dissolved in 132.5 grams of water and this solution was poured into the mixture. Finally 175 grams of $CS_2$ were added. The reaction proceeded at a temperature of about 30° C. for about 8 hours. An orange-coloured, clear solution was obtained, the yield of which according to Clarke's determination of $CS_2$ was 96%. This solution was diluted with water to a concentration of about 0.5 mol of the disodium salt per liter. After 2 grams of a nonionic wetting agent were added to the solution, 247 grams of dimethylthiocarbamyl-chloride were added over a period of about 1.5 hours at 20° C. Intensive agitation prevented clump-formation. After another hour of agitation, the precipitate was filtered and the filter cake re-slurried in water of 40° C. After 2 hours of agitation the suspension was filtered again and the filter cake washed with water. After drying, 346 grams of a yellow product were obtained. The product was shown to be homogeneous by chromatographic analysis. Yield: 87%. Melting point: 185° C.

EXAMPLE II

When equivalent amounts of the following dialkyl thiocarbamylchlorides were substituted for the dimethylthiocarbamylchloride of Example I, similar results were obtained:

Diethylthiocarbamylchloride
Dipropylthiocarbamylchloride
Di-isobutylthiocarbamylchloride
Methylethylthiocarbamylchloride The compounds of the present invention can be used to accelerate the vulcanization of natural rubber, synthetic rubbers and other vulcanizable organic materials. The accelerators are generally used in amounts of from about 0.1 to about 3.0% by weight based on the rubber in the composition, and can be employed together with other materials such as fillers, antioxidants, retarders, etc.

The vulcanization of natural and synthetic rubber by the use of the compounds of the invention is illustrated in the following Tables I–IV. The proportions of the various materials used are expressed as parts by weight. The compounds of the invention and the comparative accelerators were added to the following base recipes in the amounts of 0.5 and 2.0% by weight, based on the rubber in the composition.

|  | Recipe I | Recipe II |
|---|---|---|
| Smoked sheet rubber | 100.0 |  |
| Styrene-butadiene rubber 1,500 |  | 100.0 |
| Whiting pigment | 50.0 |  |
| High abrasion furnace black |  | 50.0 |
| Zinc oxide | 3.0 | 5.0 |
| Stearic acid | 2.0 | 3.0 |
| Plasticizer (Para-Flux) |  | 10.0 |
| Sulfur | 3.0 | 2.0 |

Mooney scorch was determined at 148° C., and tensile sheets were cured for 10, 20, 40 and 80 minutes at 148° C. Modulus at 300% (M), tensile strength (T), ultimate elongation (E) and Shore A hardness (H) determinations made are shown in the Tables III and IV.

Scorch time is the time at a specified temperature during which a compound retains the plastic characteristics needed for processing; the period of delayed action before vulcanization starts. Mooney scorch time is the time at a specified temperature, after the dies are closed, necessary to produce a viscosity rise of a definite number of points above the minimum. ASTM D1077–56T measures Mooney scorch as the time to a 5 point rise as the scorch time. Mooney scorch and cure curve is the curve of viscosity vs. time as determined with a Mooney viscosimeter. The time is measured from the time the dies are closed and until the viscosity rises at least 35 points above minimum. For practical purposes six measurements can be used to characterize the curve and if necessary, reconstruct it. These are: $m$=minimum viscosity; $T_m$=last time at minimum viscosity; $T_5$, $T_{10}$ and $T_{35}$ to reach 5, 10 and 35 points above minimum viscosity.

Table I.—Recipe I

| Mooney Scorch | No accelerator | Compound Example I 0.5% | Compound Example I 2.0% |
|---|---|---|---|
| $m$ | 11 | 14 | 14 |
| $T_m$ | 4 | 3 | 3 |
| $T_2$ | 9 | 5 | 4 |
| $T_5$ | 14 | 6 | 5 |
| $T_{10}$ | 21 | 6 | 5 |
| $T_{35}$ | 36 | 7 | 6 |

Table II.—Recipe II

| Mooney Scorch | No accelerator | Compound Example I 0.5% | Compound Example I 2.0% |
|---|---|---|---|
| $m$ | 21 | 21 | 22 |
| $T_m$ | 13 | 6 | 6 |
| $T_2$ | 27 | 9 | 8 |
| $T_5$ | 43 | 11 | 9 |
| $T_{10}$ | 62 | 12 | 9 |
| $T_{35}$ | 128 | 14 | 11 |

Table III.—Recipe I

| Product | Cure at 148° C., minutes | M, lbs./in.² | T, lbs./in.² | E, Percent | H |
|---|---|---|---|---|---|
| No accelerator | 0 | (¹) | (¹) | (²) | (²) |
|  | 20 | 25 | 250 | 710 | 29 |
|  | 40 | 50 | 675 | 770 | 32 |
|  | 80 | 75 | 925 | 700 | 35 |
| Compound 0.5%, Example I | 10 | 375 | 3,125 | 700 | 53 |
|  | 20 | 300 | 2,625 | 700 | 52 |
|  | 40 | 250 | 2,425 | 720 | 49 |
|  | 80 | 225 | 2,400 | 740 | 48 |
| Compound 2.0% Example I | 10 | 475 | 1,425 | 480 | 59 |
|  | 20 | 400 | 1,250 | 500 | 58 |
|  | 40 | 350 | 600 | 380 | 57 |
|  | 80 | 375 | 575 | 360 | 56 |

¹ No cure.
² Id.

Table IV.—Recipe II

| Product | Cure at 148° C., minutes | M, lbs./in.² | T, lbs./in.² | E, Percent | H |
|---|---|---|---|---|---|
| No accelerator | 10 | (¹) | (¹) | (¹) | --- |
|  | 20 | (¹) | (¹) | (¹) | --- |
|  | 40 | (²) | (²) | (²) | 52 |
|  | 80 | (²) | (²) | (²) | 54 |
| Compound 0.5%, Example I | 10 | (²) | (²) | (²) | 54 |
|  | 20 | 1,075 | 2,500 | 510 | 64 |
|  | 40 | 1,625 | 2,375 | 370 | 68 |
|  | 80 | 1,825 | 2,350 | 380 | 68 |
| Compound 2.0%, Example I | 10 | 775 | 2,400 | 650 | 62 |
|  | 20 | --- | 2,450 | 260 | 73 |
|  | 40 | --- | 2,025 | 210 | 75 |
|  | 80 | --- | 2,050 | 210 | 76 |

¹ No cure.
² Did not cure.

What is claimed is:

1. A compound of the formula

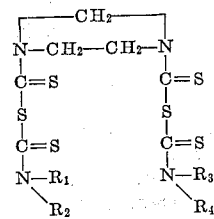

wherein $R_1$, $R_2$, $R_3$ and $R_4$ each represent an alkyl group having from 1 to 4 carbon atoms.

2. A compound according to claim 1, wherein in the formula $R_1$, $R_2$, $R_3$ and $R_4$ each represent methyl.

3. A rubber composition containing as a vulcanization accelerator a compound having the formula

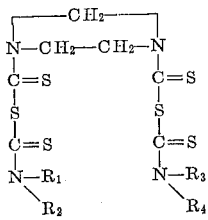

wherein $R_1$, $R_2$, $R_3$ and $R_4$ each represent an alkyl group having from 1 to 4 carbon atoms.

4. A rubber composition according to claim 3, wherein the accelerator is present in an amount of from 0.1 to 3.0% by weight, based on the rubber in the composition.

5. A rubber composition containing as a vulcanization accelerator a compound having the formula

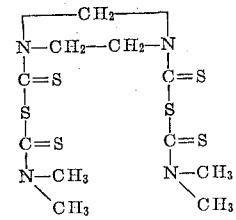

6. A rubber composition according to claim 5, wherein the accelerator is present in an amount of from 0.1 to 3.0% by weight, based on the rubber in the composition.

7. A process for vulcanizing rubber, which comprises using as an accelerator a compound having the formula

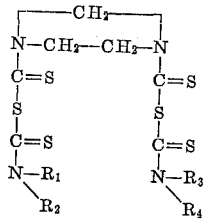

wherein $R_1$, $R_2$, $R_3$ and $R_4$ each represent an alkyl group having from 1 to 4 carbon atoms.

8. A process for vulcanizing rubber, which comprises using as a vulcanization accelerator a compound having the formula

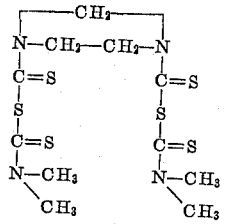

No references cited.

JAMES A. SEIDLECK, *Primary Examiner.*
F. L. DENSON, *Assistant Examiner.*